A. GILMAN.
Railroad Car-Truck.
No. 160,821. Patented March 16, 1875.
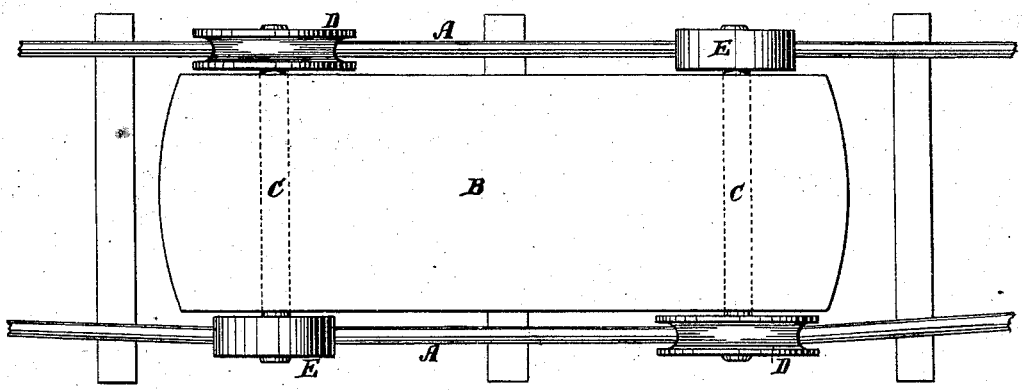
WITNESSES:
A. Bennersendorf.
A. F. Terry
INVENTOR:
A. Gilman
BY
Munn
ATTORNEYS.
THE GRAPHIC CO. PHOTO-LITH. 39 & 41 PARK PLACE, N.Y.

UNITED STATES PATENT OFFICE.

ALONZO GILMAN, OF LEWISTON, IDAHO TERRITORY.

IMPROVEMENT IN RAILROAD-CAR TRUCKS.

Specification forming part of Letters Patent No. 160,821, dated March 16, 1875; application filed November 14, 1874.

*To all whom it may concern:*

Be it known that I, ALONZO GILMAN, of Lewiston, in the county of Nez Perces and Territory of Idaho, have invented a new and useful Improvement in Railroad-Cars, of which the following is a specification:

My invention consists of the application of one double-flanged wheel and one plain or flat-rimmed wheel, i. e., without a flange, to the same axle of a railroad-car truck. The invention also consists in an alternate arrangement of these wheels on adjacent axles, as hereinafter described.

The drawing is a plan view of a section of a railway with a truck provided with my improved arrangement of wheels.

A represents the rails, B the truck, C the axle, D the double-flanged wheels, and E the wheels without a flange. One double-flanged wheel keeps the car on the rails quite as well as two single-flanged wheels. There is also less slip and thrust and less crowding or friction against the inner side of the rails than when two single-flanged wheels are used. Whatever slip occurs in passing around curves or by lateral shifting movement of a car causes less wear or injury to the rail on which the flat-tread wheels E rest than would be sustained if the ordinary conical single-flanged wheels were used instead. And it is obvious the rails will be less often displaced or spread apart in proportion as the lateral thrust is diminished, while the ease of motion of the car is increased. The flat tread-wheels likewise facilitate replacing the car upon the track when accidentally displaced.

By the alternate arrangement of the flanged and non-flanged wheels, both rails are utilized, keeping the cars properly on the rails, and the action upon the cars is equalized.

I do not claim a plain-tread wheel, nor a car-truck in which plain-tread and double-flanged wheels are employed; but—

Having thus described my invention, I claim as new and desire to secure by Letters Patent—

1. The combination of the car-axle, double-flanged wheel D, and flat-tread wheel E, said wheels being applied to opposite ends of the axle, as set forth.

2. The combination of the car-axles, double-flanged wheels D D, and flat-tread wheels E E, similar wheels being diagonally opposite, as set forth.

ALONZO GILMAN.

Witnesses:
   J. M. CURRY,
   J. GREENFIELD.